United States Patent [19]

King

[11] Patent Number: 5,259,298

[45] Date of Patent: Nov. 9, 1993

[54] FUNNEL ARRANGEMENT FOR A BEVERAGE BREWER

[75] Inventor: Alan M. King, Westmount, Canada

[73] Assignee: VKI Technologies, Inc., Canada

[21] Appl. No.: 787,396

[22] Filed: Nov. 4, 1991

[51] Int. Cl.⁵ .............................................. A47J 31/32
[52] U.S. Cl. .................................. 99/289 R; 99/302 P
[58] Field of Search ................ 99/287, 289 R, 297, 99/279, 289 T, 289 P, 302 R, 302 P, 316, 318, 290, 291, 292, 293, 294, 295, 296, 297, 298, 299, 300, 319, 320, 323

[56] References Cited

U.S. PATENT DOCUMENTS

| | | | |
|---|---|---|---|
| 871,492 | 11/1907 | Dunlap | 99/287 |
| 2,199,592 | 5/1940 | Holmes | 99/315 |
| 2,522,102 | 9/1950 | Dold | 99/289 |
| 2,608,927 | 9/1952 | Gaskell, Jr. | 99/312 |
| 3,074,341 | 1/1963 | Tarrant et al. | 99/314 |
| 3,364,843 | 1/1968 | Lagana | 99/312 |
| 3,626,839 | 12/1971 | Martin | 99/315 |
| 3,757,670 | 9/1973 | Laama et al. | 99/302 R |
| 3,764,017 | 10/1973 | Dover | 99/287 |
| 3,937,134 | 2/1976 | Molenaar et al. | 99/295 |
| 4,550,024 | 10/1985 | le Granse | 99/295 |
| 4,632,023 | 12/1986 | King | 99/302 P |
| 4,791,859 | 12/1988 | King | 99/289 R |
| 4,793,246 | 12/1988 | Barradas | 99/316 |
| 4,873,916 | 10/1989 | Piscaer | 99/287 |
| 4,903,586 | 2/1990 | King | 99/287 |
| 4,967,647 | 11/1990 | King | 99/280 |

*Primary Examiner*—Robert W. Jenkins
*Assistant Examiner*—Reginald L. Alexander
*Attorney, Agent, or Firm*—Hill, Steadman & Simpson

[57] ABSTRACT

An improved funnel for a beverage brewer which provides that the water supplied to the brewer enters into the funnel and passes into the brewer chamber to slots formed in the funnel and shaped so as to prevent air being expelled from the brewer chamber from below from causing the water to splash outside of the funnel during the brewing cycle. Ledges are formed on the lower edges of the slots which act as platforms for the water to rinse away coffee grounds during the short wash cycle of the coffee brewer.

3 Claims, 1 Drawing Sheet

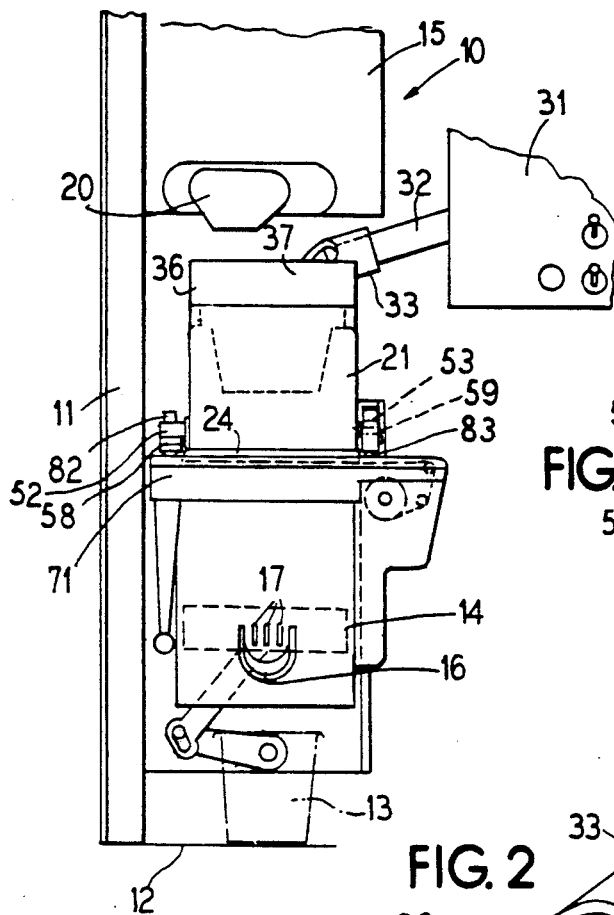
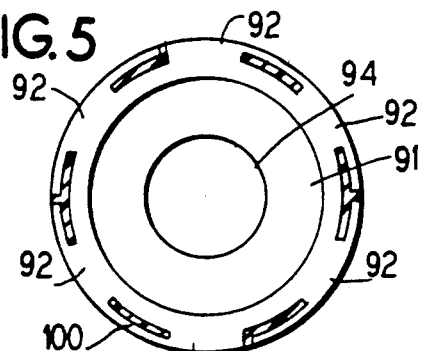
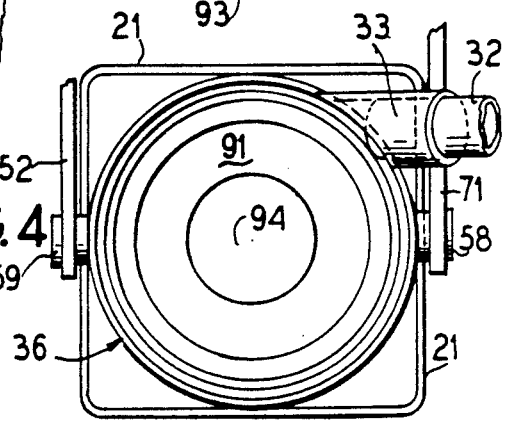
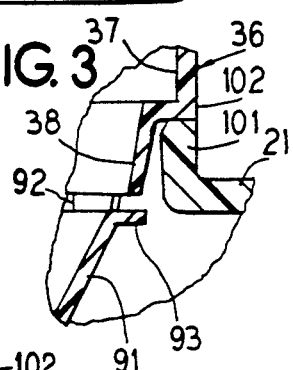
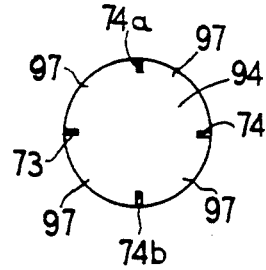
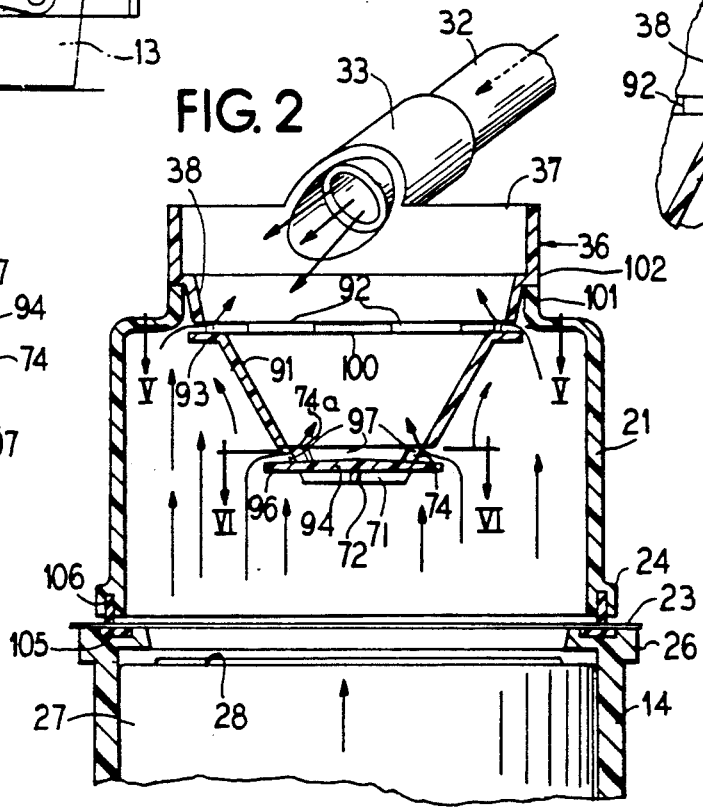

FUNNEL ARRANGEMENT FOR A BEVERAGE BREWER

BACKGROUND OF THE INVENTION

1. Field of the Invention

This invention relates in general to a coffee brewer structure and in particular to an improved funnel for supplying water to the brewer.

2. Description of Related Art

U.S. Pat. Nos. 4,967,647, 4,903,586, 4,632,023 and 4,791,859 disclose beverage machines such as coffee makers in which air is injected to mix with the water and coffee during the brewing cycle.

SUMMARY OF THE INVENTION

The present invention comprises an improvement in a coffee brewer and in particular into an improved funnel which receives the incoming water and supplies it to the brewing chamber and which has a pair of slots through which the water is supplied into the brewer and air is emitted from the brewer such that the water and coffee are agitated as the brewer piston moves in the up direction to force the air out of the upper brewing chamber. Ledges are formed about the slots of the funnel. The funnel structure prevents splashing outside of the brewing chamber as air is forced out of the brewing chamber while water is being supplied into the upper brewing chamber. Very little moisture is forced directly from the funnel due to its construction and deflectors or ledges are provided adjacent the openings of the funnel so as to reduce splashing and also so as to act as platforms for the water to rinse away coffee grounds during the short wash cycle which occurs as the piston of the brewing machine moves downwardly during the wash cycle.

It is an object of the present invention to provide an improved funnel for a coffee brewing machine which prevents splashing and results in efficient mixing of the coffee and water during the brewing cycle.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a plan view of a coffee brewing machine with the improved funnel of the invention;

FIG. 2 is a sectional view of the upper brewing chamber and the funnel of the invention;

FIG. 3 is an enlarged cut-away sectional view of the funnel of the invention;

FIG. 4 is a top plan view of the coffee brewer illustrating the funnel;

FIG. 5 is a sectional view taken on line V—V in FIG. 2; and

FIG. 6 is a sectional view taken on line VI—VI in FIG. 2.

DETAILED DESCRIPTION OF THE PREFERRED EMBODIMENTS

FIG. 1 illustrates a beverage machine 10 which comprises a vertical frame member 11 and a base 12 upon which a beverage cup 13 can be mounted.

A coffee reservoir 15 has an output spout 20 for supplying coffee to the beverage machine. The lower brewing chamber 14 has beverage outputs slots 17 which supply the prepared beverage to a spout 16 that is caught by the cup 13.

The upper brewing chamber 21 is supported by pivot pins 59, and 58 by support bars 52, and 53, respectively. The support bars are pivotally attached to frame members 82 and 83, which are part of main frame 71 as illustrated in FIG. 1. As explained in U.S. Pat. Nos. 4,967,647 and 4,903,586 periodically the upper chamber 21 is separated from the lower chamber 14 and a filter 23 is cleaned and washed or replaced between coffee brewing cycles. The details of this operation are shown in the referenced patents and will not be repeated herein.

The upper brewing chamber 21 has a square cross-section as illustrated in FIG. 4 and has a round collar 101 at its top upon which the novel brewer funnel 36 of the invention is mounted. The brewer funnel 36 has an upper annular portion 37 with a bracket 33 which receives a water supply tube 32 therethrough and the water supply 32 is connected to a water reservoir 31 as illustrated in FIG. 1. The annular portion 37 is connected to a conical section 38 which is connected to a lower conical portion 91. Openings 92 are formed between the conical portion 38 and conical portion 91 and the lower conical portion 91 is formed with a top ledge 93 adjacent the openings 92 as illustrated.

The lower portion of conical member 91 is truncated and is joined to a baffle 94 by ribs 73 and 74 so as to provide an opening between the baffle 94 and the lower portion of the member 91. The openings 97 thus formed allow fluid to pass therethrough and onto a ledge 96 of the baffle 94 which extends beyond the openings 97. Ribs 71 and 72 are formed on the lower side of the baffle 94.

FIG. 3 is a partially cut-away sectional view illustrating how the upper annular portion 37 has a portion 102 that extends inwardly to the conical portion 38 which joins to the portion 101 of the upper brewing chamber 21. The openings 92 and the ledge 93 of the lower conical portion 91 are also illustrated in FIG. 3.

FIG. 6 is a plan view of the baffle 94 and shows the ribs 73, 74, 74a and 74b and the openings 97 between the ribs.

FIG. 5 is a sectional view taken on line V—V of FIG. 2 and illustrates the ribs 100 and openings 92 as well as the ledge 93 and the baffle 94.

FIGS. 1 and 2 illustrate the manner in which the lower brewing chamber 14 is connected to the upper brewing chamber 21 wherein the lower brewing chamber 14 has an upper portion 26 in which a gasket 105 is mounted and the filter 23 is mounted between the gasket 105 and a gasket 106 carried in a groove in a lower portion 24 of the upper brewing chamber 21. The piston 27 has an upper surface 28 and as the piston 27 is moved upwardly and downwardly in the lower brewing chamber 14 it forces air shown by arrows up through the filter 23 and out the openings 97 above the baffle 94 and through openings 92. Simultaneously, heated water is supplied into the funnel 36 through conduit 32 and the water passes into the upper brewing chamber 21 due to gravity through the openings 92 and 97. The ledges 93 and 96 prevent the water from being splashed outside of the brewing chamber. The air agitates the water in the brewing chambers to cause an efficient brewing of coffee.

It is seen that this invention relates to a novel funnel which is formed with upper and lower openings with ledges or shoulders formed beneath them so as to allow water to enter through the openings into the upper chamber.

The angles of the slots relative to the sidewalls of funnel are such that very little splashing occurs outside of the brewing chamber. At the same time, the ledges 93 and 96 assist in preventing moisture from being forced directly from the funnel. They also act as platforms for the water so as to rinse away coffee grounds during the short wash cycle which occurs as the piston moves down in a later portion of the brew cycle.

It is seen that this invention provides a novel funnel for a brewer which prevents splashing and splashing.

Although the invention has been described with respect to preferred embodiments, it is not to be so limited as changes and modifications can be made which are within the full intended scope of the invention as defined by the appended claims.

We claim as our invention:

1. In a coffee brewer which has a lower brewing chamber and an upper brewing chamber in engagement with said lower brewing chamber and with a filter mounted between said upper and lower brewing chamber, a piston moveably mounted in said lower brewing chamber and a driving means connected to said piston to move it up and down in said lower brewing chamber, means for supplying ground coffee and hot water into said upper brewing chamber through a funnel, the improvement comprising, a funnel mounted to the top portion of said upper brewing chamber and said ground coffee and hot water supplied thereto and said funnel has a truncated conical-shaped portion and is formed with upper openings formed at the upper periphery of said truncated conical-shaped portion, and an upper ledge formed adjacent the lower edge of said upper openings and extending outwardly toward the walls of said upper brewing chamber, and lower openings formed in the lower portion of said truncated conical-shaped portion.

2. In a coffee brewer according to claim 1 wherein said lower openings of said funnel are formed between a disc-shaped lower baffle and the lower end of said funnel and said lower baffle extends beyond the edges of said funnel.

3. In a coffee brewer, an improved funnel according to claim 1 comprising an upper annular portion of said funnel with its lower edge joined with the edge of said truncated conical-shaped portion, and said means for supplying hot water comprises a water supply tube which is attached to a bracket in said upper annular portion of said funnel.

* * * * *